United States Patent [19]

Hantke et al.

[11] 4,082,114

[45] Apr. 4, 1978

[54] VALVE ASSEMBLY FOR USE IN AN AIR DISTRIBUTION SYSTEM

[75] Inventors: Gerhard John Hantke, La Crosse, Wis.; Harry Kenneth Ring, Jr., Houston, Minn.

[73] Assignee: The Trane Company, La Crosse, Wis.

[21] Appl. No.: 763,735

[22] Filed: Jan. 28, 1977

[51] Int. Cl.² ............ F16K 31/12; F16K 31/04; F24F 7/00

[52] U.S. Cl. ............ 137/625.37; 251/63.6; 251/133; 236/49

[58] Field of Search ............ 251/144, 61.4, 63.6, 251/133; 236/49; 137/625.37, 625.38, 219

[56] References Cited

U.S. PATENT DOCUMENTS

| | | | |
|---|---|---|---|
| 2,725,891 | 12/1955 | Bourguignon | 137/219 |
| 3,961,748 | 6/1976 | McNabney | 137/625.38 X |

*Primary Examiner*—Arnold Rosenthal
*Attorney, Agent, or Firm*—Carl M. Lewis; Peter D. Ferguson

[57] ABSTRACT

A valve assembly is disclosed having utility in building air distribution systems, particularly those of the variable air volume type. The assembly includes a plenum chamber having a generally cylindrical sleeve disposed therein, connected to a supply of conditioned air at one end thereof, the other end being blocked by a closure member. A generally cylindrical, balanced valve member cooperates with radially extending apertures in the sleeve to control flow into the plenum chamber. The valve member is mounted for axial movement on tubular means having a bore which extend axially into the sleeve from the closure member.

In order to apply an actuating force to the valve member, connecting means extend therefrom to a position upstream from the end of the tubular means and terminate in a force receiving portion. Means are provided to apply an axial force to said portion by way of the bore in the tubular means and may comprise:

1. a pressure operated diaphragm disposed adjacent said portion to receive a fluid under pressure by way of said bore;

2. a rod extending axially through the closure member and tubular means connected to the force receiving portion, including diaphragm means mounted external of the sleeve; or 3. a rod extending axially through the closure member and tubular means in threaded engagement with the force receiving portion, including a reversible electric motor rotatably connected thereto and mounted externally of the sleeve.

Interchangeable components are utilized to the extent possible in the three embodiments in order to reduce costs.

30 Claims, 7 Drawing Figures

VALVE ASSEMBLY FOR USE IN AN AIR DISTRIBUTION SYSTEM

BACKGROUND OF THE INVENTION

1. Field of the Invention

The present invention relates to a valve assembly having utility in air distribution systems of the type generally used to air condition building structures. One of the most common types of such systems is the variable air volume wherein a central source of conditioned air is provided and distributed to various zones within the building via a network of ducts. Since the heating or cooling load requirements will vary from zone to zone, and within a particular zone depending upon factors such as solar load and current use, it is necessary that means be provided to selectively control the amount of conditioned air supplied to a particular zone in response to local demand.

In the variable air volume system, the above-noted objective is accomplished through the provision of at least one plenum chamber associated with each zone, generally located in a ceiling plenum above the zone, which includes one or more air outlets in communication with the zone. A control valve within the plenum chamber is controlled by a thermostat in the zone to supply the proper volume of conditioned air thereto so as to maintain a predetermined temperature.

The present invention is directed to a novel control valve assembly for use in an air distribution system as described above.

2. Description of the Prior Art

The most common type of control valve presently used in variable air volume systems is shown in U.S. Pat. No. 3,687,364 and comprises a plenum chamber having an inlet and outlet with a flat damper plate disposed therebetween to control flow. An actuator mounted external to the plenum chamber is linked to the damper plate and positions same in response to zeno temperature. Said actuator may be either an electric motor as shown in the referenced patent, or a pneumatic cylinder as shown in U.S. Pat. No. 3,719,321.

A more recent development in control valves of the type under consideration is disclosed in U.S. Pat. No. 3,974,859, assigned to the same assignee as the present application. This valve is characterized by a cylindrical sleeve disposed within the plenum chamber having one end thereof connected to conditioned air supply duct and including a plurality of radially extending apertures passing therethrough. A cylindrical valve member is disposed within the sleeve and mounted for movement between first and second positions so as to selectively vary air flow from the sleeve into the plenum chamber via the radial apertures. The valve member is designed in such a way that its axial ends are in communication, resulting in a balanced valve.

The present invention is directed generally to a valve of the latter type, including novel actuator structure incorporated therewith, resulting in a commercially practical valve assembly which may be powered using a variety of currently available thermostatic controls.

SUMMARY OF THE INVENTION

The present invention comprises a valve assembly including a plenum chamber having an inlet opening and at least one outlet. Conduit means admit conditioned air to the plenum chamber through the inlet opening and include a generally cylindrical sleeve, at least a portion of which is disposed within the plenum chamber and includes aperture means passing radially therethrough. A closure member at an end portion of the sleeve serves to block axial air flow and also includes tubular means extending axially therefrom into the sleeve.

A generally cylindrical valve member is mounted on the tubular means for axial movement between first and second positions substantially coextensive and non-coextensive, respectively, with the aperture means, thereby controlling flow from the interior of the sleeve to the plenum chamber. Actuator means are provided for exerting an axial force on the valve member and include connecting means extending from the valve member to a position upstream of the tubular means, terminating in a force receiving portion.

In order that an axial force be applied to said force receiving portion, means are provided for doing so by way of the bore in the tubular means and may comprise 1. a pressure operated diaphragm disposed adjacent said portion to receive a fluid under pressure by way of said bore;

2. a rod extending axially through the closure member and tubular means connected to the force receiving portion, including diaphragm means mounted external of the sleeve; or 3. a rod extending axially through the closure member and tubular means in threaded engagement with the force receiving portion, including reversible motor means rotatably connected thereto and mounted externally of the sleeve.

In a preferred embodiment, the connecting means comprise a generally cylindrical sheath connected at one end to the valve member and disposed concentrically about the tubular means, extending axially to a position upstream from the end thereof and terminating in an end cap. The sheath is of small diameter relative to the sleeve so as not to present an obstruction to air flow while providing a convenient and easily assembled portion of the actuator structure. In the first two embodiments of the invention, biasing means are provided in the form of a coil spring surrounding the tubular means in abutting relationship at one end to the valve member, restrained at its other end by a radially extending abutment on the tubular means. The aforementioned sheath encloses said spring along its length.

It is an object of the present invention to provide a valve assembly as described above which includes novel actuator means incorporated therewith in such a manner as to eliminate the need for mounting same external of the plenum chamber.

It is a further object of the present invention to provide a valve assembly as described wherein certain elements of the actuator means are disposed within the sleeve at a position upstream from the valve member and are of small diameter relative thereto, resulting in a compact arrangement of parts.

Another object of the present invention is the use of tubular means having a bore for mounting the valve member and concurrent use of said bore for passing an actuating force to the valve member, obviating the need for further access openings in the sleeve.

Yet a further object of the present invention is the provision of a valve assembly as described wherein the valve member and actuating means may be mounted solely by the closure member, thus eliminating the need for further internal connections to the sleeve.

A further object of the present invention is the provision of a valve assembly as described wherein the sleeve may be mounted to the plenum chamber as an integral unit, including the valve member and its actuating structure, thereby facilitating assembly and maintenance procedures.

Another object of the present invention relates to the provision of a basic valve assembly which lends itself to the use of alternative power sources for actuation thereof, while retaining, to the extent possible, the use of interchangeable parts therefor.

These and further objects of the invention will become apparent from the following description of a preferred embodiment and by reference to the accompanying drawings.

DESCRIPTION OF A PREFERRED EMBODIMENT

Figure 1:
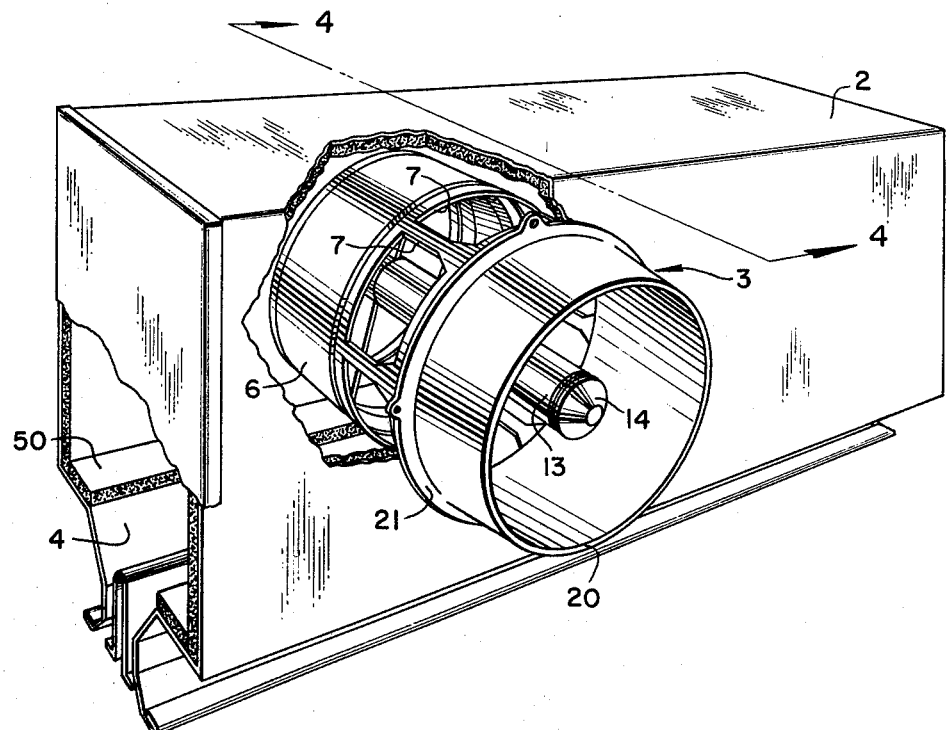
FIG. 1 is a perspective view, partially cut away, of a first embodiment of the present invention wherein the plenum chamber comprises an air diffuser.
Figure 4:
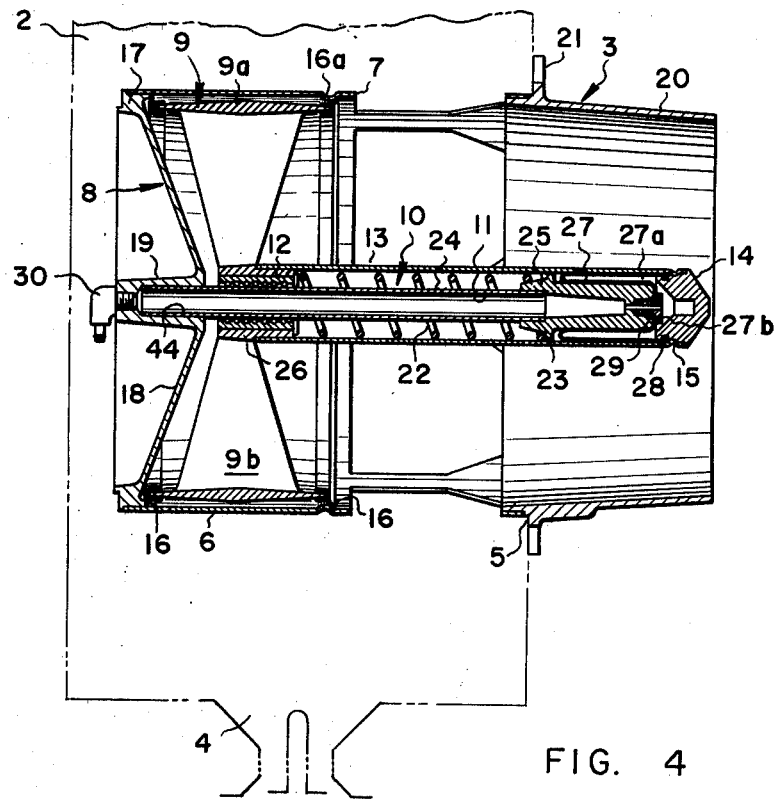
FIG. 4 is a cross-sectional view taken along line 4—4 of FIG. 1, illustrating an external powered embodiment of the invention.

Turning now to FIGS. 1 and 4 of the drawings, a first embodiment of the present invention will be described in detail.

A plenum chamber 2 is provided in the form of an air diffuser having a circular inlet opening 5 in a side wall thereof and an outlet 4. As will be appreciated by those skilled in the art, this type of plenum chamber is adapted to be supported on a ceiling grid formed by inverted T-bars so as to supply conditioned air to a room therebelow. A layer of insulation 50 is provided within the plenum chamber to deaden sound, provide thermal insulation, and prevent condensation on the plenum exterior.

Conduit means indicated generally at 3 are provided for supplying conditioned air to the plenum chamber and include an adapter ring 20 and sleeve 6 which is disposed within the plenum chamber itself. Adapter ring 20 as shown includes a radially extending flange 21 for connection to a wall of the plenum chamber and also includes an axially extending flange passing through the inlet opening for connection to the sleeve. As will be appreciated by those skilled in the art, the outer portion of adapter ring 20 is fashioned so as to accept the terminal end of a duct for the supply of conditioned air thereto. It should be noted at this time that the entire adapter ring and sleeve assembly is readily installed within the plenum chamber utilizing only a single connection, resulting in an easily assembled and maintained unit.

A plurality of radially extending aperture means 7 are located within the sleeve 6 and provide communication between its interior and the plenum chamber itself. The inner end of sleeve 6 disposed within plenum chamber 2 is closed off by a closure member 8 in order to block axial air flow therethrough. Said closure member includes a circumferential flange 17 which is inserted within the end of sleeve 6 for attachment thereto through the use of machine screws or other well-known fastening means. Closure member 8 further includes a conical wall portion 18 which tapers inwardly toward the sleeve and terminates in an outwardly directed cylindrical portion 19 having inwardly facing bore 44.

Tubular means 10 are disposed within bore 44 and extend axially therefrom into the sleeve. As shown, tubular means 10 include a tubular member 24 having a bore 11 which may be press fit or otherwise maintained with bore 44, and further include an end piece 25 fastened at its terminal end. Mounted on tubular means 10 is a generally cylindrical valve member 9 which includes an outer circumferential portion 9a for coaction with aperture means 7, valve member 9 being movable axially between a first position substantially coextensive with aperture means 7, thereby blocking flow therethrough; and a second position substantially non-coextensive therewith for permitting flow therethrough. Annular sealing means 16 constructed of a resilient material are provided at the axial ends of circumferential portion 9a for engagement with the inner flange of adapter ring 20 and an indented portion 16a of sleeve 6. A plurality of radially extending weblike members 9b connect circumferential portion 9a of the valve member to a central hub portion 26 in such manner as to provide communication between its axial ends, thereby balancing the fluid pressure forces to which it is subjected.

Central hub 26 of valve member 9 surrounds tubular means 10 and includes therein bearing means 12 which preferably take the form of a commercially available linear ball bearing assembly, although a sleeve-type bearing could be substituted therefor. In this manner, low friction operation of the valve is obtained requiring small actuating forces for operation thereof.

In order that an actuating force be applied to valve member 9, connecting means are fastened thereto and extend axially therefrom to a position upstream from the end of tubular means 10, terminating in a force receiving portion. As shown, the connecting means include a sheath 13 which completely surrounds tubular means 10 and terminates at a position upstream therefrom where an end cap 14 is provided and defines said force receiving portion. Although end cap 14 is shown as a separate cylindrical plug retained in sheath 13 by detent means 15, it is within the scope of the invention that the end cap be integrally formed with sheath 13. Moreover, in lieu of detent means 15, it may be desirable to utilize removable fastening means such as screws in order to maintain end cap 14 within sheath 13, thereby facilitating repair procedures.

Also shown in FIG. 4 are biasing means 22 in the form of a coil spring which surrounds tubular means 10 and is in abutting relationship with valve member 9 at its leftmost end as seen in FIG. 4. Since spring 22 is restrained from axial movement at its other end by a radial abutment 23 on end piece 25, it will be seen that an axial biasing force is exerted upon valve member 9.

Although spring 22 is illustrated as having an outer diameter substantially equal to the inner diameter of sheath 13, it is within the scope of the present invention that said spring may be of smaller diameter, closely surrounding tubular member 24.

In order that an actuating force be applied to the force receiving portion of the connecting means, means are provided adjacent end cap 14 whereby an enclosed volume 27a is defined for the receipt of a fluid under pressure. Such means in the present embodiment comprise a flexible diaphragm 27 of generally cylindrical configuration, having one end fastened to the force receiving portion of said connecting means and the other end connected to the end of the tubular means. Specifically, diaphragm 27 includes a radially inturned lip 28 which engages a groove in the outer periphery of end cap 14 and is maintained therein by suitable adhesive means, in addition to the retaining force provided by sheath 13. The other end of diaphragm 27 includes a portion 29 of reduced diameter and having a bore which is maintained within the axial bore of end piece 25, as through the use of an expandable rivet 27b. As is apparent from FIG. 4, diaphragm 27 has a diameter substantially equal to that of end piece 25, whereby it may roll back over the outer surface of end piece 25 upon contraction thereof.

It should now be apparent that, upon the admission of a pressurized fluid to enclosed volume 27a, an axial force will be exerted upon end cap 14, whereby valve member 9 will be urged to the right (as seen in FIG. 4) to close aperture means 7, thus reducing flow into plenum chamber 2. For this purpose, a fitting 30 is provided within a threaded bore of closure member 8 whereby air under pressure may be admitted through the closure member, through the bore 11 of tubular means 10 and into enclosed volume 27a by way of the bore within portion 29 of flexible diaphragm 27. In practice, a suitable pneumatic thermostat would be provided within the zone being served in order to transmit a pneumatic signal to the valve assembly. Such thermostats are well-known in the art and commercially available, generally exhibiting an operating range of 0 – 20 psi.

From the above description, it is believed that operation of the valve assembly as illustrated in FIG. 4 will be readily apparent. Upon an appropriate pneumatic signal from the thermostat, the fluid under pressure will be admitted through the bore of tubular means 10 and the bore of flexible diaphragm 27 into enclosed volume 27a. Since the inner surface of end cap 14 projects an area substantially perpendicular to the axis of the tubular means, an axial force will be exerted thereon due to the presence of said pressurized fluid. Flexible diaphragm 27 serves to maintain enclosed volume 27a in a sealed condition. As an alternative to the construction shown in FIG. 4, it is possible that a diaphragm having a closed end could be substituted for diaphragm 27, in which case end cap 14 could possibly be dispensed with, the end of the diaphragm simply being adhesively bonded to the inner periphery of sheath 13. It is further possible that, in lieu of a diaphragm member for defining the enclosed volume 27a, that annular sealing means could be disposed adjacent radial abutment 23 for co-action with the inner periphery of sheath 13, thereby defining an enclosed volume which would serve the same function as that shown. The present construction is preferred, however, in that it assures a more positive and reliable seal than would the aforementioned annular sealing means and also presents less resistance to movement of sheath 13 with respect to elements of tubular means 10.

Figure 2:
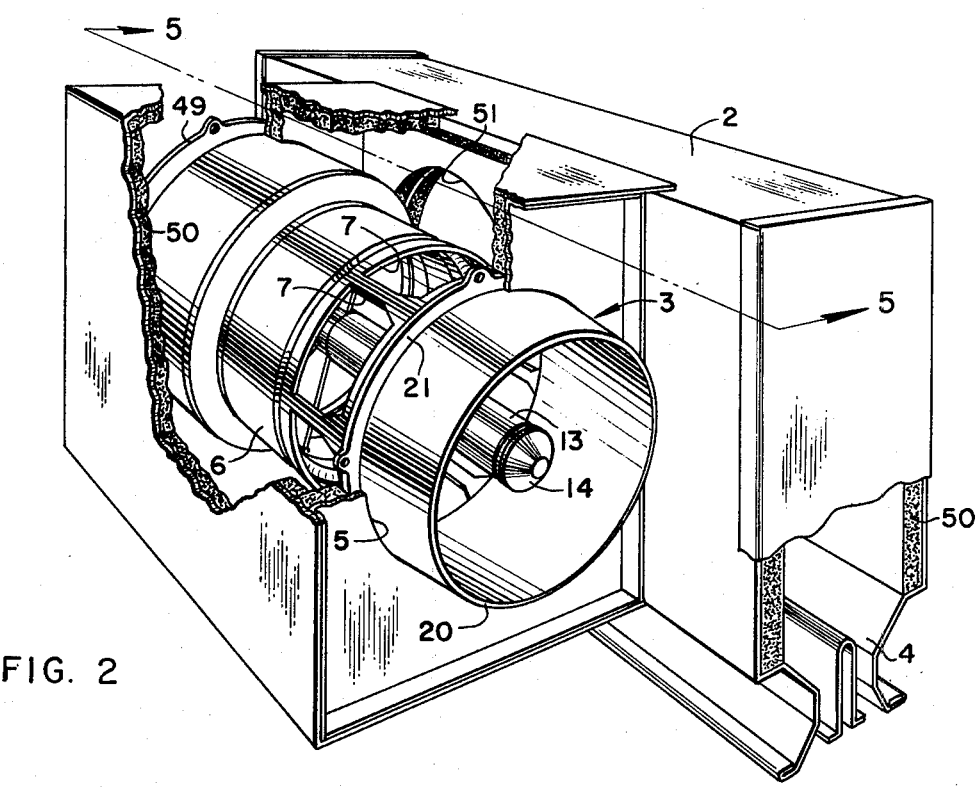
FIG. 2 is a perspective view, partially cut away, of a second embodiment of the present invention wherein the plenum chamber comprises a mounting box attached to the side of an air diffuser.
Figure 5:
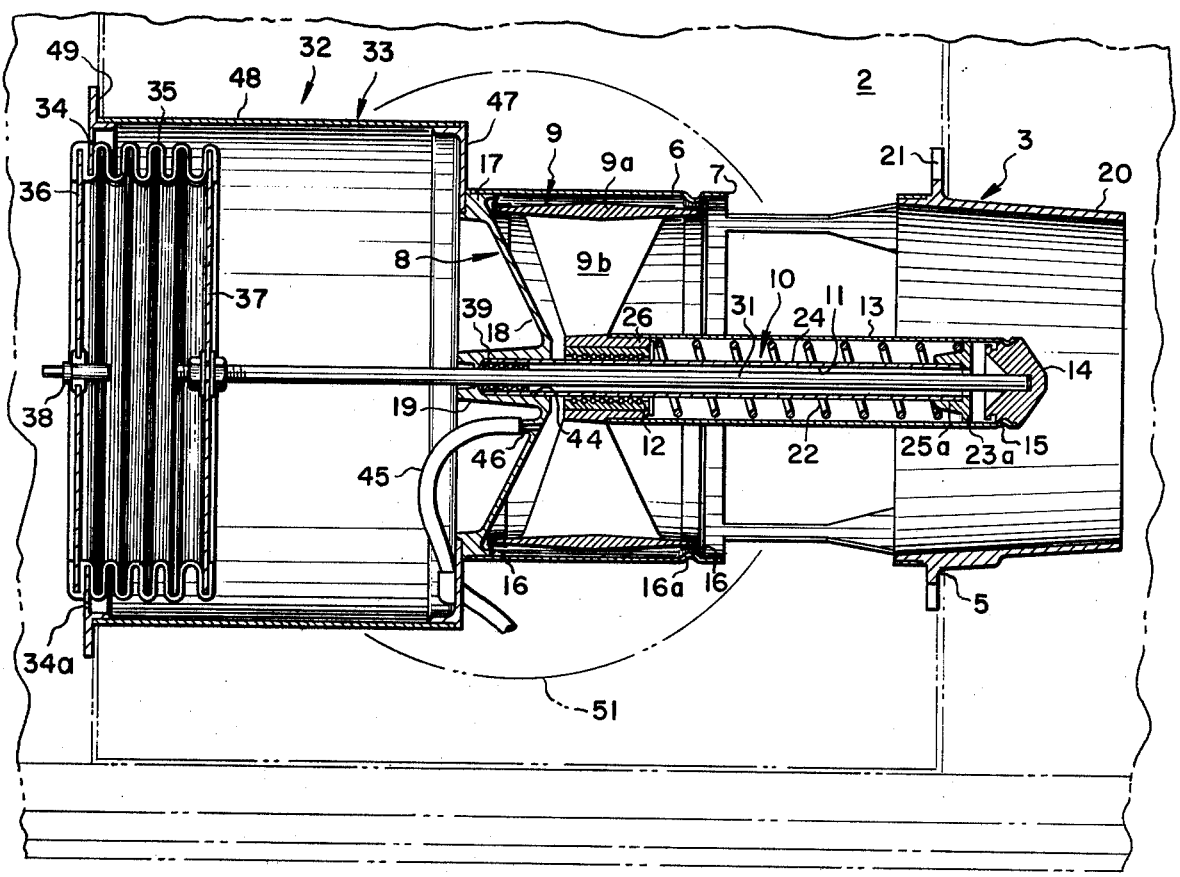
FIG. 5 is a cross-sectional view taken along line 5—5 of FIG. 2, illustrating a system powered embodiment of the invention.

Turning now to FIGS. 2 and 5 of the drawings, there is illustrated a second embodiment of the present invention wherein like reference numerals have been used to indicate common elements.

The valve assembly of FIG. 2 includes a plenum chamber 2 which differs from that of FIG. 1 in that it is made up of two rectangular sheet metal boxes, one of which is fastened to the side of the other and includes inlet opening 5 of the plenum chamber. Communication between the two boxes is provided by an opening 51 in a side wall of said other box, thereby permitting air flow to outlet 4 of plenum chamber 2. It has been found that this type plenum chamber provides quieter operation under certain conditions than does that of FIG. 1.

Passing through inlet opening 5 are conduit means indicated generally at 3 which includes an adapter ring 20 and sleeve 6, the latter being disposed within said plenum chamber. As in the previous embodiment, adapter ring 20 includes a radially extending flange 21 for connection to the plenum chamber and an outwardly directed cylindrical portion for connection to a duct. Aperture means 7 are again provided for communicating the interior of sleeve 6 with the interior of the plenum chamber.

Closure member 8 as shown in FIG. 5 performs substantially the same function as it did in the embodiment of FIG. 4 in that it serves to block axial air flow and to support tubular means 10 which extend axially therefrom into the sleeve. Tubular means 10 again comprise a tubular member 24 and end piece 25a. Valve member 9 is slideably supported upon the tubular means, as in the previous embodiment, for movement between first and second positions substantially coextensive and noncoextensitve, respectively, with aperture means 7, thereby controlling flow from the interior of sleeve 6 to the interior of plenum chamber 2. The actuator means associated with this embodiment of the invention are similar to that disclosed in FIG. 4 to the extent that connecting means are fastened to the valve member and extend therefrom to a position upstream from the end of tubular means 10, terminating in a force receiving portion. Once again, the connecting means comprise a sheath 13 which surrounds tubular means 10 and extends to a position upstream therefrom and terminates in an end cap 14, said end cap defining the force receiving portion of said connecting means.

This embodiment of the invention also entails the use of biasing means for exerting a force on valve member 9, which means again comprise a coil spring 22 which surrounds the tubular means and is in abutting relationship with valve member 9 at one end thereof, being restrained from axial movement at the other end by a radial abutment 23a on end piece 25a.

In order to impart an actuating force to the force receiving portion of the connecting means, a rod 31 is provided which passes through a bore in closure member 8, by way of the bore 11 in tubular member 24 and through a corresponding bore in end piece 25a. The terminal end of rod 31 is received within a bore of end cap 14. As further seen in FIG. 5 bearing means in the form of a linear bearing 39 are provided for supporting rod 31 for axial movement and maintaining same in alignment. The external end of rod 31 is connected to diaphragm means indicated generally at 32 for imparting an actuating force thereto.

The diaphragm means shown in FIG. 5 are designed so as to operate utilizing pressures much lower than that of FIG. 4 and, specifically, to enable the use of system air pressure in order to actuate the damper. Such control systems are known in the art, as evidenced by the aforementioned U.S. Pat. No. 3,974,859. To this end, there is provided a fitting 46 on the external side of closure member 8 for transmitting a portion of the system air under pressure by way of conduit means 45 to a suitable thermostatic control.

The diaphragm means of FIG. 5 include a housing indicated generally at 33, which housing includes an annular end plate 47 fastened to closure member 8 and extending radially therefrom. Cylindrical portion 48 of housing 33 is fastened to end plate 47 at its periphery and extends axially away therefrom, terminating in an annular plate having an outwardly directed radial flange 49 and a radially inturned flange 34, the functions of which will become apparent.

Disposed within housing 33 is a generally cylindrical diaphragm 35 having a flexible wall portion which defines a plurality of corrugations. As may be seen in FIG. 5, radially inturned flange 34 is disposed within an outwardly facing corrugation of said diaphragm and, adjacent thereto, an end plate 36 is engaged within an inwardly facing corrugation thereof. Diaphragm 35 extends axially into housing 33 and terminates with a circular frontal plate 37 having its edge portions engaged within an inwardly facing corrugation of said diaphragm. It has been found that due to the relatively low operating pressures encountered with this embodiment of the invention, no adhesive or sealant material is required in assembling diaphragm 35 to end plate 36, flange 34, and frontal plate 37, a feature which greatly facilitates assembly and replacement of the diaphragm means. Frontal plate 37 is fastened to the terminal end of rod 31 whereby, upon admission of a pressurized fluid to the enclosed volume formed by diaphragm 35, end plate 36 and frontal plate 37, an actuating force will be applied thereto. For this purpose, a fitting 38 is provided extending through end plate 36, which fitting may be connected to a suitable thermostatically controlled source of pressurized fluid. Reference may be had to the above-mentioned U.S. Pat. No. 3,874,859 for disclosure of one thermostatic control system which would have application with this embodiment of the present invention.

In order to maintain the interior of housing 33 at atmospheric or ambient pressure, a plurality of vent openings 34a are provided extending through radially inturned flange 34. Thus, in the event of conditioned air leakage into housing 33, it will be immediately vented so as not to interfere with operation of diaphragm 35.

The assembly comprising sleeve 6 adapter ring 20 and diaphragm means 32 is mounted within a plenum chamber 2 at one end by radial flange 21 adjacent its inlet opening and at the other end by outwardly directed flange 49, through the use of suitable fastening means such as machine screws. It will thus be apparent that the entire assembly may be simply inserted within a relatively large diameter opening in one end of plenum chamber 2, allowing adapter ring 20 to pass through inlet opening 5 until radial flange 21 contacts the inner wall of the plenum chamber. Since no further damper actuator structure need be mounted externally of plenum chamber 2, assembly of the unit is facilitated along with any required maintenance therefore.

Figure 6:
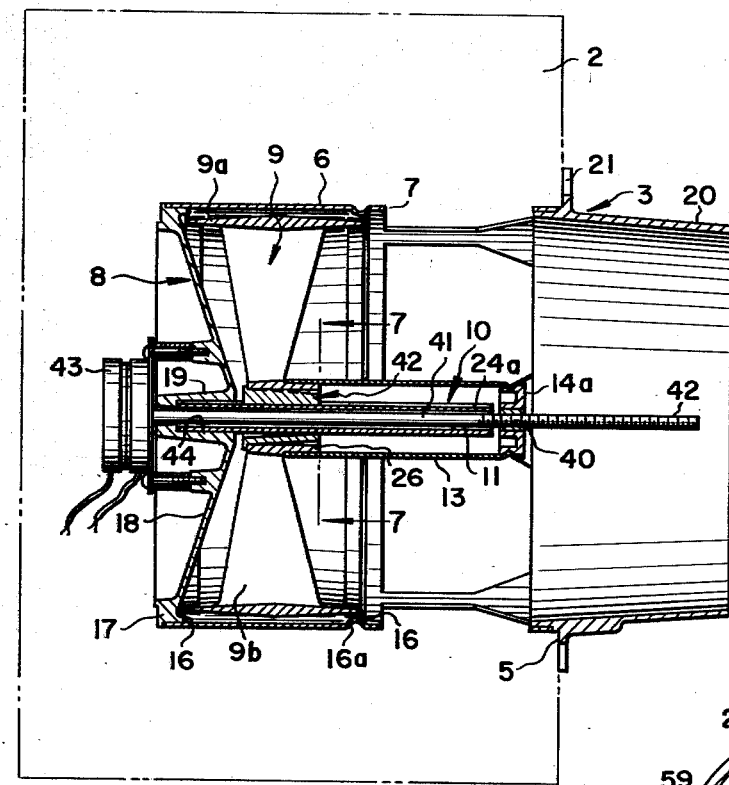
FIG. 6 is a cross-sectional view taken along line 6—6 of FIG. 3 wherein an electric motor serves as the power source for the actuator.
Figure 3:
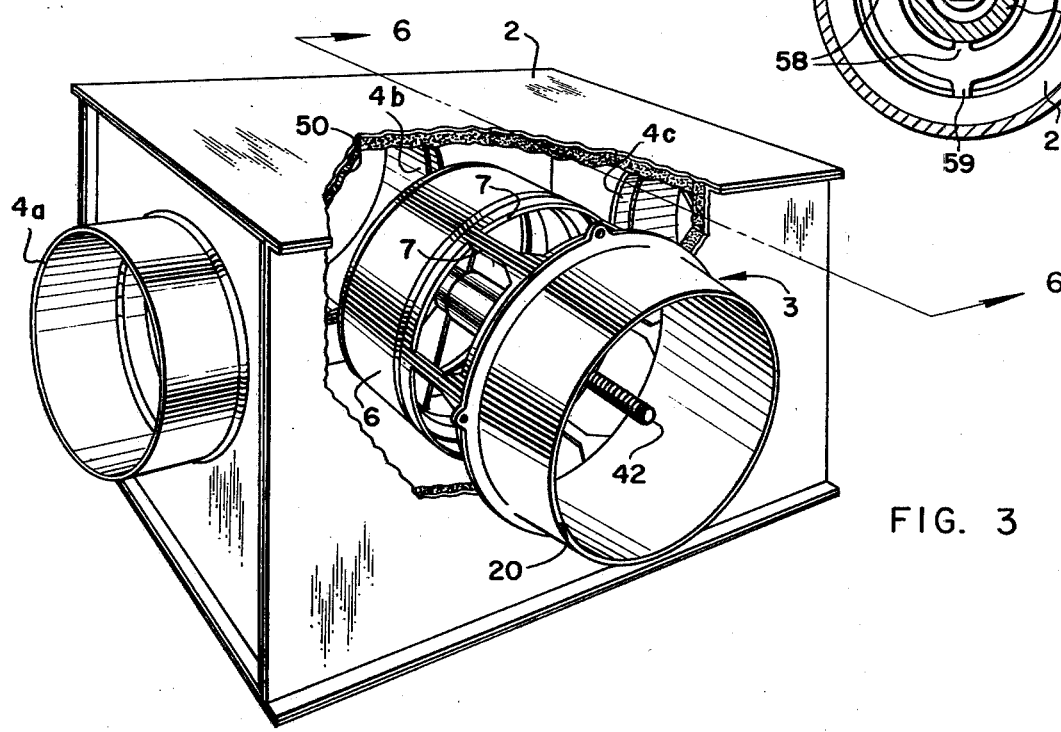
FIG. 3 is a perspective view, partially cut away, of a third embodiment of the present invention wherein the plenum chamber comprises a control unit for serving a plurality of air diffusers.

A third embodiment of the invention is illustrated in FIGS. 3 and 6 and takes the form of a control unit; that is, a valve assembly which is adapted to supply conditioned air to two or more air distribution units serving zone(s) to be maintained at a common temperature. Its plenum chamber thus includes inlet opening 5 and a plurality of outlets 4a, b, c adapted for connection to ducts. Since the basic features of this embodiment of the invention are identical to those of the previous two embodiments, this discussion will focus upon the differences in the actuating structure which distinguish this embodiment from those of FIGS. 4 and 5.

Connecting means are again provided in the form of a sheath 13 which is fastened to valve member 9 at one end thereof and extends axially therefrom to a position upstream from the end of tubular means 10, terminating in a force receiving portion in the form of end cap 14a. As shown, end cap 14a includes a threaded bore 40 having engaged therein the threaded portion 42 of a rod 41 which extends from a position external of the sleeve, through a bore in closure member 8, and by way of the bore 11 of tubular means 10. Motor means 43 are mounted on the external side of closure member 8 and are connected to rod 41 so as to impart rotary motion thereto. Such motor means in the preferred embodiment comprise a reversible electric motor. As will be apparent to those skilled in the art, rotation of rod 41 will impart axial motion to end cap 14a due to its threaded engagement therewith, resulting in axial movement of valve member 9.

Figure 7:
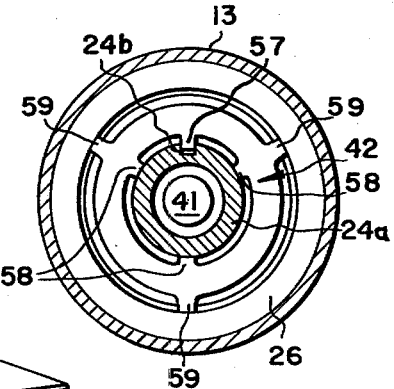
FIG. 7 is a cross-sectional view taken along line 7—7 of FIG. 6.

In order to prevent rotation of valve member 9 with rod 41, bearing means 42 are provided which are best illustrated in the cross-sectional view of FIG. 7. As there shown, tubular member 24a is provided with an axially extending keyway or groove 24b. Bearing means 42, which are engaged within hub 26 of valve member 9, include a radially inwardly directed protrusion 57 which engages groove 24b in order to prevent rotation of bearing means 42 with respect to tubular member 24a. Also disposed about the inner periphery of bearing means 42, are a plurality of inwardly directed protrusions 58 which slideably engage the outer surface of tubular member 24a. Radially outwardly directed protrusions 59 are disposed about the outer periphery of bearing means 42 and are press fit or otherwise suitably retained within hub 26 of valve member 9.

The valve assembly of FIG. 6 may be controlled using conventional electric thermostatic circuitry as for example, that disclosed in U.S. Pat. No. 3,687,364. Thus, upon rotation of motor means 43 in clockwise and counterclockwise directions, valve member 9 will be moved axially between first and second positions, thereby controlling air flow from the interior of sleeve 6 into plenum chamber 2.

As in FIG. 4, the adapter ring/sleeve assembly is mounted within plenum chamber 2 only at its inlet opening, resulting in ease of assembly and maintenance.

It should be pointed out at this time that the three types of valve/sleeve/actuator units disclosed are not limited to use in the specific type of plenum chamber illustrated. For example, an electrically powered unit could be utilized with a diffuser-type plenum chamber shown in FIGS. 1 and 2 or a self-powered unit could be utilized in a control unit as shown in FIG. 3.

Having thus described three embodiments of the present invention, the following observations may be noted with respect thereto.

Each embodiment of the invention incorporates tubular means 10 having a bore 11 which is supported solely by closure member 8, extending axially therefrom into sleeve 6. Mounted on tubular means 10 through the use of suitable bearing means is valve member 9. Actuator means are incorporated with valve member 9 and tubular means 10 and include connecting means which extend axially from the valve member to a position upstream from the terminal end of the tubular means. In this manner, the bore 11 of tubular means 10 may be used in order to transmit an actuating force to the connecting means and therefore to the valve member itself. Moreover, this scheme permits the mounting of all internal actuating structure, either directly or indirectly, by tubular means 10. Thus no further internal connections are required to sleeve 6 other than those at its terminal end whose closure member 8 is fastened thereto. Not only does this save in assembly time, but, should a unit need repair in the field, it is a relatively simple matter to remove the old valve actuator assembly and replace it with a new one. The present invention may be contrasted in this respect with U.S. Pat. No. 3,974,859 wherein not only is a closure member required to support the valve member and its associated actuating structure, but an internal "spider" is also required, requiring further internal connections to the sleeve member.

It is further important to note that in the three embodiments of the present invention the actuator means are compactly arranged at a position upstream from the valve member itself. By maintaining a small diameter for these components, obstruction to air flow is minimized while taking advantage of space which would otherwise not be utilized.

Each embodiment of the invention is so designed that a pre-assembled valve member/sleeve assembly may be readily inserted into a plenum chamber with minimum connections or alternations thereto. As pointed out before, this is an important consideration as regards assembly and maintenance.

A further advantage of the present invention lies in the fact that a "family" of valve assemblies is provided which incorporate to the extent practical, interchangeable elements, regardless of the power source used for actuation. For example, standard components such as the sleeve, valve member, adapter ring, tubular member, and the sheath may be made to be interchangeable throughout all three embodiments of the invention. To a lesser extent, components such as the end cap, end piece, and coil spring may also be made interchangeable. It may further be noted that the closure member may be formed of a basic casting which may be identical for all three embodiments, requiring only minor machining operations in order to accommodate a specific application.

While the invention has been described with respect to a preferred embodiment, it is to be understood that modifications thereto will be apparent to those skilled in the art within the scope of the invention, as defined in the claims which follow:

We claim:

1. A valve assembly for use in an air distribution system comprising:
   a. a plenum chamber having an inlet opening and an outlet;
   b. conduit means for admitting air to said plenum chamber through said inlet opening and including a generally cylindrical sleeve having at least a portion thereof disposed within said plenum chamber, said portion including aperture means passing radially therethrough for providing communication between the interior of said sleeve and the interior of said plenum chamber;
   c. a closure member disposed at the end portion of said sleeve downstream from said aperture means for blocking axial air flow;
   d. a generally cylindrical valve member disposed within said sleeve and including an axially extending portion adjacent the inner periphery of said sleeve, said valve member further including means for providing communication between its axial ends to thereby substantially balance the axial pressure forces to which it is subjected;
   e. tubular means having a bore extending axially from said closure member into said sleeve;
   f. bearing means associated with said valve member for mounting same on said tubular means for axial movement between a first position substantially coextensive with said aperture means, thereby blocking flow therethrough, and a second position substantially non-coextensive with said aperture means for permitting flow therethrough;
   g. actuator means drivingly connected to said valve member for selectively positioning same between said first and second positions, said actuator means comprising
      i. connecting means fastened to said valve member and extending axially therefrom to a position upstream from the end of said tubular means, terminating in a portion adapted to receive an axial force; and
      ii. means for applying an axial force to said force receiving portion by way of the bore in said tubular means.

2. The valve assembly of claim 1 wherein said connecting means comprise a generally cylindrical sheath fastened at one end to said valve member and disposed substantially concentrically about said tubular means, said sheath extending axially to a position upstream from the end of said tubular means and terminating in an end cap which defines said force receiving portion.

3. The valve assembly of claim 2 wherein said end cap comprises a cylindrical plug inserted within the end of said sheath and including fastening means for maintaining same in position.

4. The valve assembly of claim 1 wherein said valve member includes annular sealing means disposed about its axial end portions for coaction with the inner periphery of said sleeve.

5. The valve assembly of claim 1 wherein said closure member includes a circumferential flange secured to the end portion of said sleeve and a generally conical wall portion tapering inwardly therefrom, terminating in an outwardly directed cylindrical portion having an inwardly facing bore; said tubular means being retained within said bore and extending axially therefrom into said sleeve.

6. The valve assembly of claim 1 wherein said conduit means include a generally cylindrical adapter ring fastened to the upstream end of said sleeve and extending therefrom through said inlet opening, further including a radially extending flange connected to said plenum chamber.

7. The valve assembly of claim 1 including biasing means for urging said valve member toward one of said first and second positions.

8. The valve assembly of claim 7 wherein said connecting means comprise a generally cylindrical sheath fastened to said valve member and disposed substantially concentrically about said tubular means, said sheath extending axially to a position upstream from the end of said tubular means and terminating in an end cap which defines said force receiving portion.

9. The valve assembly of claim 8 wherein said end cap comprises a cylindrical plug inserted within the end of said sheath and including fastening means for maintaining same in position.

10. The valve assembly of claim 8 wherein said biasing means comprises a coil spring surrounding said tubular means and in abutting relationship to said valve member at one end thereof, the other end being restrained from axial movement by a radial abutment projecting from said tubular means; said sheath being of larger diameter than said spring and enclosing same along its length.

11. The valve assembly of claim 7 wherein said biasing means comprises a coil spring surrounding said tubular means and in abutting relationship to said valve member at one end thereof, the other end being restrained from axial movement by a radial abutment projecting from said tublar means.

12. The valve assembly of claim 11 wherein said tubular means comprises:
   a. a tubular member having a bore fixed to said closure member and extending axially into said sleeve; and
   b. an end piece secured to the end of said tubular member and having a bore communicating with the bore thereof, said end piece further defining said radial abutment for restraining said spring.

13. The valve assembly of claim 7 wherein said bearing means for mounting the valve member on said tubular means comprises a linear bearing.

14. The valve assembly of claim 7 wherein
   a. said valve member includes a central hub having said bearing means disposed therein surrounding said tubular means;
   b. said connecting means comprises a generally cylindrical sheath fastened at one end to said hub and disposed substantially concentrically about said tubular means, said sheath extending axially to a position upstream from the end of said tubular means and terminating in an end cap which defines said force receiving portion; and
   c. said biasing means comprises a coil spring surrounding said tubular means and in abutting relationship to said hub at one end thereof, the other end being restrained from axial movement by a radial abutment projecting from said tubular means; said sheath being of larger diameter than said spring and enclosing same along its length.

15. The valve assembly of claim 7 wherein said means for applying an axial force comprises:
   a. means defining an enclosed volume adjacent the force receiving portion of said connecting means and operatively associated therewith such that, upon admission of a pressurized fluid to said volume, an axial force is exerted upon said force receiving portion; and
   b. means for admitting a fluid under pressure to said enclosed volume by way of the bore in said tubular means, thereby resulting in axial movement of said valve member and providing selective positioning thereof between said first and second positions.

16. The valve assembly of claim 15 wherein the force receiving portion of said connecting means comprises a surface having a projected area substantially perpendicular to the axis of said tubular member, said surface defining, in part, said enclosed volume.

17. The valve assembly of claim 15 wherein said means defining an enclosed volume comprises a flexible diaphragm fastened to said connecting means and to said tubular means.

18. The valve assembly of claim 17 wherein said flexible diaphragm is generally cylindrical, having one end fastened to said connecting means and extending axially therefrom towards the end of said tubular means and fastened thereto such that its flexible cylindrical wall is substantially concentric therewith, whereby said flexible diaphragm may roll back over the outer surface of said tublar means upon contraction thereof.

19. The valve assembly of claim 18 wherein the force receiving portion of said connecting means comprises a generally cylindrical end cap having an outer diameter substantially equal to that of said diaphragm, said one end of the cylindrical diaphragm including a radially inturned lip sealingly engaged within a circumferential groove about the periphery of said end cap.

20. The valve assembly of claim 18 wherein the end of said diaphragm fastened to the end of said tubular means comprises a cylindrical portion of reduced diameter sealingly engaged within the terminal end of the bore of said tubular means, said cylindrical portion including an axial bore for passage of said fluid under pressure.

21. The valve assembly of claim 15 wherein said closure member includes a threaded bore in communication with the bore of said tubular means for connection to a source of pressurized fluid.

22. The valve assembly of claim 7 wherein said means for applying an axial force comprises a rod extending axially from a position external to said sleeve, through said closure member and the bore of said tubular means, to the force receiving portion of said connecting means.

23. The valve assembly of claim 22 further comprising pressure operated diaphragm means connected to the external portion of said rod.

24. The valve assembly of claim 23 wherein said diaphragm means comprise:
   a. a generally cylindrical housing extending axially from said closure member and terminating in a radially inturned flange;
   b. a generally cylindrical diaphragm disposed within said housing have a flexible wall portion defining a plurality of corrugations, said radially inturned flange fitting within an outwardly facing corrugation of said diaphragm;
   c. a generally circular end plate disposed adjacent said inturned flange and fitting within an inwardly facing corrugation of said diaphragm;
   d. a generally circular frontal plate disposed opposite said end plate and spaced therefrom by the length of said diaphragm, said frontal plate fitting within an inwardly facing corrugation of said diaphragm and being connected to the external portion of said rod; and
   e. means for admitting a fluid under pressure to the enclosed volume formed by said end plate, said diaphragm, and said frontal plate, whereby upon expansion and contraction of said diaphragm, said valve member may be selectively positioned between said first and second positions.

25. The valve assembly of claim 22 including bearing means disposed in said closure member for slideably engaging said rod.

26. The valve assembly of claim 1 wherein
a. the force receiving portion of said connecting means includes a threaded bore in axial alignment with the bore of said tubular means; and
b. the means for applying an axial force to said force receiving portion comprises a rod extending axially from a position external to said sleeve through said closure member and the bore of said tubular means terminating in a threaded portion in engagement with said threaded bore; further including motor means connected to the external portion of said rod for rotating same in clockwise and counterclockwise directions, whereby said valve member undergoes axial movement between said first and second positions.

27. The valve assembly of claim 26 wherein said bearing means includes means for preventing rotation of said valve member with respect to said tubular means.

28. The valve assembly of claim 26 wherein said connecting means comprise a generally cylindrical sheath fastened at one end to said valve member and disposed substantially concentrically about said tubular means, said sheath extending axially to a position upstream from the end of said tubular means and terminating in an end cap which defines said force receiving portion and includes said threaded bore.

29. The valve assembly of claim 26 wherein said motor means comprise an electric motor mounted on the external side of said closure member.

30. A valve assembly for use in an air distribution system comprising:
a. a plenum chamber having an inlet opening and an outlet;
b. conduit means for admitting air to said plenum chamber through said inlet opening and including a generally cylindrical sleeve having at least a portion thereof disposed within said plenum chamber, said portion including aperture means passing radially therethrough for providing communication between the interior of said sleeve and the interior of said plenum chamber;
c. a closure member disposed at the end portion of said sleeve downstream from said aperture means for blocking axial air flow;
d. a generally cylindrical valve member disposed within said sleeve and including an axially extending portion adjacent the inner periphery of said sleeve, said valve member further including means for providing communication between its axial ends to thereby substantially balance the axial pressure forces to which it is subjected;
e. tubular means having a bore extending axially from said closure member into said sleeve;
f. bearing means associated with said valve member for mounting same on said tubular means for axial movement between a first position substantially coextensive with said aperture means, thereby blocking flow therethrough, and a second position substantially non-coextensive with said aperture means for permitting flow therethrough;
g. actuator means drivingly connected to said valve member for selectively positioning same between said first and second positions, said actuator means including means for applying an axial force to said valve member by way of the bore in said tubular means.

* * * * *